United States Patent [19]
Carrott et al.

[11] Patent Number: 6,163,403
[45] Date of Patent: Dec. 19, 2000

[54] HIGH OUTPUT REFLECTIVE OPTICAL CORRELATOR HAVING A FOLDED OPTICAL AXIS USING GRAYSCALE SPATIAL LIGHT MODULATORS

[75] Inventors: David T. Carrott, Palmdale; Gary L. Mallaley, Thousand Oaks, both of Calif.

[73] Assignee: Litton Systems, Inc., Woodland Hills, Calif.

[*] Notice: This patent issued on a continued prosecution application filed under 37 CFR 1.53(d), and is subject to the twenty year patent term provisions of 35 U.S.C. 154(a)(2).

[21] Appl. No.: 09/126,309

[22] Filed: Jul. 30, 1998

[51] Int. Cl.⁷ .............................. G02B 27/46; G06K 9/62
[52] U.S. Cl. ........................... 359/561; 382/278; 708/816
[58] Field of Search .................................... 359/561, 560; 382/210, 211, 278, 280; 708/816

[56] References Cited

U.S. PATENT DOCUMENTS

| | | |
|---|---|---|
| 4,573,198 | 2/1986 | Anderson . |
| 5,132,811 | 7/1992 | Iwaki et al. .............................. 359/561 |
| 5,148,496 | 9/1992 | Anderson . |
| 5,311,359 | 5/1994 | Lucas et al. . |
| 5,386,313 | 1/1995 | Szegedi et al. . |
| 5,418,380 | 5/1995 | Simon et al. . |
| 5,452,137 | 9/1995 | Lucas . |
| 5,659,637 | 8/1997 | Bagley, Jr. et al. ..................... 382/278 |
| 5,815,597 | 9/1998 | Horner et al. .......................... 359/361 |
| 5,847,790 | 12/1998 | Andersson et al. ..................... 349/100 |

OTHER PUBLICATIONS

"Fast portable optical correlator for real–world image processing," Optical Processing and Computing, May 1997, SPIE's International Technical Working Group Newsletter, pp 9.

"Signal Processing by light," Military & Aerospace Electronics, Nov. 1996.

*Primary Examiner*—Jon Henry
*Attorney, Agent, or Firm*—Price and Gess

[57] ABSTRACT

An optical correlator system having a plurality of both active and passive reflective optical components between a source of electromagnetic radiation, such a visible coherent light, and an output detector array in a planar support body along a folded optical axis beam path within the body uses a grayscale spatial light modulator as the input sensor and the correlating filter to provide enhanced optical detection of an unknown object at a CCD detector array.

2 Claims, 5 Drawing Sheets

HIGH OUTPUT REFLECTIVE OPTICAL CORRELATOR HAVING A FOLDED OPTICAL AXIS USING GRAYSCALE SPATIAL LIGHT MODULATORS

BACKGROUND OF THE INVENTION

1. Field of the Invention

The present invention relates generally to improvements in optical correlator systems and more particularly, pertains to a new and improved optical correlator structure to provide enhanced optical detection of an unknown object.

2. Description of Related Art

Many applications including military, medical and security have a requirement for small, lower power, low cost pattern recognition systems that are capable of locating and identifying targets or anomalies. Optical correlators can perform two dimensional pattern recognition at much greater rates than digital systems of comparable size, power and/or weight.

Many modern real time pattern recognition or pattern analysis problems, both military and commercial, can be resolved through the use of correlation. Military missions require a real-time pattern recognition capability for target detection, target recognition, munitions guidance, and many other applications. Commercial applications require a pattern analysis capability for many medical, intelligence, law enforcement, security, robotics and factory inspection applications. Specifically, there is a demand for an optical correlator pattern recognition system that is rugged, low cost, has a lower power configuration, and is very compact, temperature stable and light weight. The processing requirements for robust pattern recognition at real-time rates is very high. Current and near-term digital solutions are still not practical for many applications with respect to the cost, size, weight and power requirements.

The reflective optical correlator with a folded asymmetrical axis of U.S. Pat. No. 5,311,359 assigned to the same assignee as in the present application, discloses an optical correlator pattern recognition system that provides the processing power required at real-time rates in a small, low weight, lower power package.

FIG. 1 is an illustration of the reflective optical correlator system of U.S. Pat. No. 5,311,359. The optical correlator system 10 has a planar support body 12 with an irregular perimeter 14 and a plurality of system stations 16, 18, and 24 formed at selected locations along the irregular perimeter of the support body. A plurality of reflective optical components, which are both active 16 and passive 18, are positioned at the selected system stations. An electromagnetic radiation source 20 is positioned at a first system station. Radiation source 20, for example, may generate a coherent light beam, which traverses a folded asymmetrical optical axis or path 22 within the planar body 12, as bounded or defined by the reflective optical components 16 and 18. The optical path 22 terminates at a detector 24 positioned at the last system station.

FIG. 2 is an illustration of an optical correlator system within which the optical correlator 10 of FIG. 1 could be utilized. A specific preferred structure for the optical correlator 10 is disclosed in U.S. Pat. No. 5,311,359. The entire disclosure of U.S. Pat. No. 5,311,359 is incorporated herein by reference.

The basic concept of operation of an optical correlator 10 is illustrated by the system diagram of FIG. 2. Images 46 to be processed by the optical correlator system may be sensed by an input sensor 44, which may be an external digital camera, or any other source of image/signal data to be processed. The sensed data is provided to an image pre-processor, data formatter 42 which takes the data from the input sensor 44 and formats it for the input drive electronics 34 of a spatial light modulator (SLM) 28. SLM 28 is illuminated by a coherent beam of light from the radiation source 20, which may be a laser diode. The data supplied to the SLM 28 by the input electronics 34 patterns the light beam from the laser 20 which has been passed through a polarizer lens 24. SLM 28 reflects the patterned light beam to a first concave mirror 26 which reflects the received patterned information through a first polarizer 27 to a second spatial light modulator (SLM) 30 as a patterned Fourier transform beam. This second SLM 30 also receives filter data from filter storage in filter drive electronics 36 that represents anticipated images, as directed by a post-processor 40. This filter data is in the form of a preprocessed Fourier transformation pattern. The second SLM 30 receives the patterned Fourier transform beam at the same time as it is patterned with the Fourier transformation pattern of a known filter from the filter data base 36. This causes a multiplication of the two Fourier patterns where matches occur, and zeros where they do not match. The combined pattern of the second SLM 30 is reflected to a second concave mirror 29. The second concave mirror 29 reflects and focuses a Fourier transform of the combined pattern of SLM 30 through a second polarizer 31 onto a high speed photo detector array, such as a CCD array. The patterned beam CCD detector array 32 captures the resultant image. Detector electronics 38 and post-processor 40 use the detected information to generate an output 48 that displays the position of the original input image 46 as determined by the filter image from the data base. The amplitude of the display indicates the extent of the correlation.

For a more detailed example and explanation of an optical correlator system and structure using spatial light modulators and Fourier transform lenses, reference should be made to U.S. Pat. No. 5,418,380.

The present invention provides an improved folded and segmented optical image processor over these prior art systems.

SUMMARY OF THE INVENTION

A pattern recognition processor using an improved folded and segmented image processor that combines passive components with improved active components in a folded optical path within a planar support body to control the pattern of electromagnetic radiation from a grayscale input spatial light modulator. The input spatial light modulator patterns image information onto the received electromagnetic radiation, or visible coherent light and supplies it to a correlating filter, a second grayscale spatial light modulator, for correlation with a known grayscale filter pattern. The correlated input sensor pattern and filter pattern is focused on a detector, a charge couple device, for detection as spatial information, wherein the position of a light point identifies the correlation of the original pattern with respect to a matched filter pattern, and the amplitude of the light identifies the degree of correlation.

BRIEF DESCRIPTION OF THE DRAWINGS

The exact nature of this invention, as well as its objects and the advantages as thereof will be readily apparent from consideration of the following detailed description in conjungction with the accompanying drawings, in which like reference numerals designate like part throughout the figures thereof, and wherein.

DESCRIPTION OF THE PREFERRED EMBODIMENTS

Figure 1:
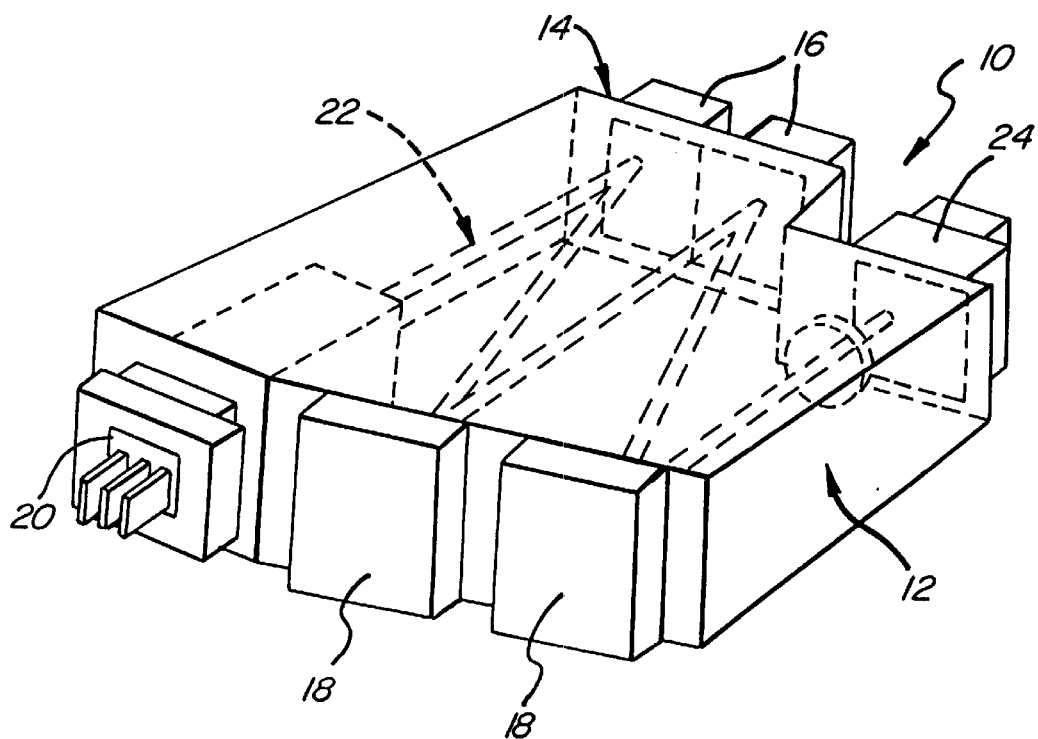
FIG. 1 is a perspective illustration of a prior art asymmetrical reflective optical correlator.
Figure 3:
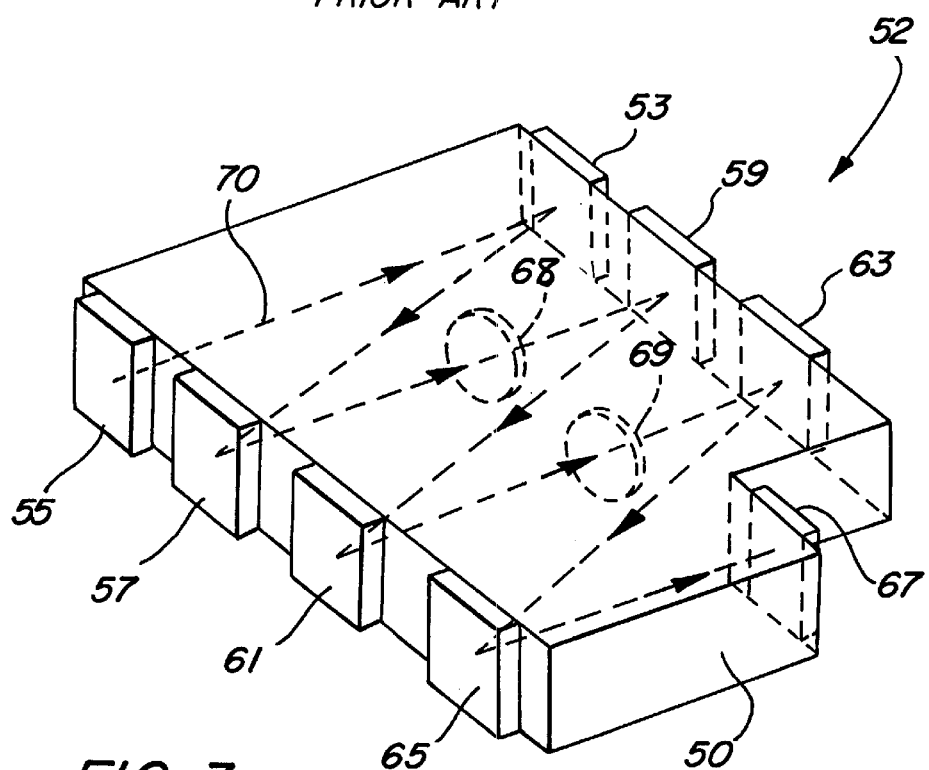
FIG. 3 is a perspective illustration of a folded and segmented optical correlator of the present invention.

The following description is provided to enable any person skilled in the art to make and use the invention and sets forth the best modes contemplated by the inventors of carrying out their invention. Various modifications, however, will remain readily apparent to those skilled in the art, since the general principles of the present invention have been defined herein specifically to provide the preferred embodiment of the optical correlator 52 of the present invention. The optical correlator 52 includes a planar support body 50, which is preferably formed from a transparent fused quartz ($SiO_2$) or a glass ceramic known as Zerodure, or similar material, in order to maintain all of the passive and active optical components in a fixed and stable configuration with respect to each other in various hostile environments having vibration and temperature variations.

An asymmetrical and folded optical path 70 has several sequential path segments starting with an electromagnetic energy source 55, which is preferably a diode laser, or like device, and ending with a pixel detector, such a CCD planar array 67. The energy beam from the laser 55 is directed to a first SLM 53 which is preferably a grayscale spatial light modulator with a 256×256 planar pixel array.

The array size is a contributing function to the path length 22, as is explained in U.S. Pat. No. 5,148,496. Assuming a constant center-to-center pixel spacing and energy beam wavelength, the array size is directly proportional to the focal length. Therefore, a 128×128 array would use half the folded path length of a folded asymmetrical body 50 used with a 256×256 array.

Grayscale spatial light modulator technology is based upon analog ferroelectric liquid crystal (FLC) materials, or analog spatial light modulator. FLC material is more common than nematic materials because of the its sub-millisecond response time.

Binary and analog spatial light modulator technology channels the ingress and egress of electromagnetic radiation, such as light, that is incident to the spatial light modulator. Binary spatial light modulator technology is based upon either binary amplitude (0:1) or binary phase (-1:1) technology. The latter is a digital version of a bipolar amplitude modulator. Binary technology, whether amplitude or phase, is based upon full swing or stop-to-stop modulation of the signal. U.S. Pat. No. 5,386,313 describes a ternary phase technology based upon a reflective magneto-optical spatial light modulator (R/MOSLM). This device has three states (-1:0:1) of modulation. Ternary technology is also stop-to-stop modulation (-1:1), but with a centering or off-position (0).

Analog technology is based upon a controlled tilt of the modulation depth, a unity range of both positive and negative (-1 . . . 1). At present operating speeds, the equivalent of 16 or more levels of gray (4-bit) can be obtained. Speed is a function of FLC material purity and designed operating temperature. Several factors apply to analog spatial light modulator technology: Tilt Range Control, Modulation Depth, and Tilt Precision. Tilt Range Control is an integral function of the spatial light modulator sub-component, and is manufacture dependent. This function is a table of tilt values mapped to a given set of input signals. The Modulation Depth is a function of the FLC material choice. Higher values of Modulation Depth provide a better control of the other two factors (Tilt Range Control and Tilt Precision). And Tilt Precision is the ability to repeat the same tilt value called for in the Tilt Range Control for the same input signal for the same assembly and across other assemblies. Because the optical correlator of the present invention uses two spatial light modulators, they must be matched. Therefore, each analog spatial light modulator has a matching requirement based upon all three factors. The factor may be pre-designed into the assembly using understood controls or as a result of post-assembly measurements.

Figure 5:
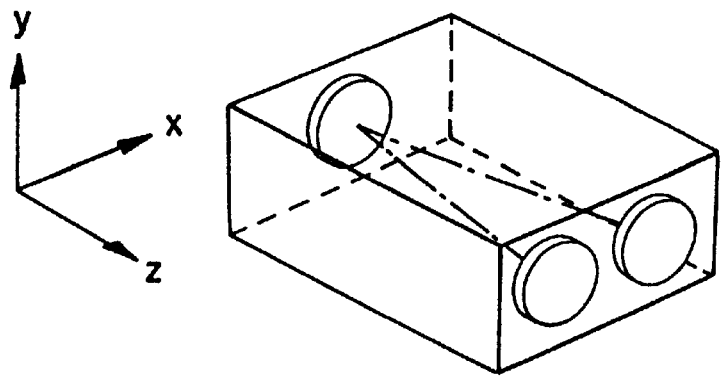
FIG. 5 is a perspective illustration of a folded beam path using a spherical mirror.

The SLM 53 receives the input image data, patterns the received energy beam 70 with the image data and reflects it to a first toric mirror 57. Rather than being concave or spherical, a toric mirror has two radii of curvature. A toric and a concave or spherical mirror are reminiscent of a square and rectangle, where a spherical mirror (Rx=Ry) is a special case of a toric mirror (Rx≠Ry). These radii (Rx,Ry) are the radius of curvature with respect to the meridian plane (x-z) and the radius of curvature with respect to the meridian plane being different from the radius of curvature along the saggital plane (y-z) (FIG. 5). The reason for the difference is found in the reflective angle of the mirror, a function of folding the path length. The saggital plane is that of the beam path as observed looking down on the zigzag path, FIG. 6. The meridian plane is that of the beam path as observed looking along the beam path, FIG. 7.

Figure 6:
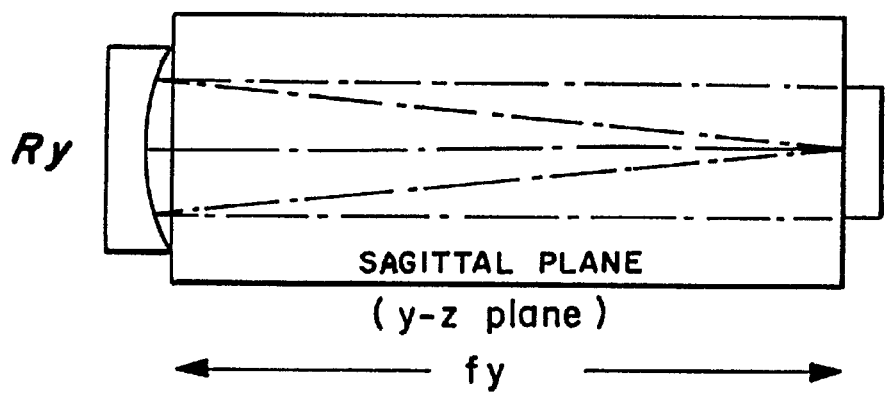
FIG. 6 is a plan view of the FIG. 5 beam path in the y-z plane.
Figure 7:
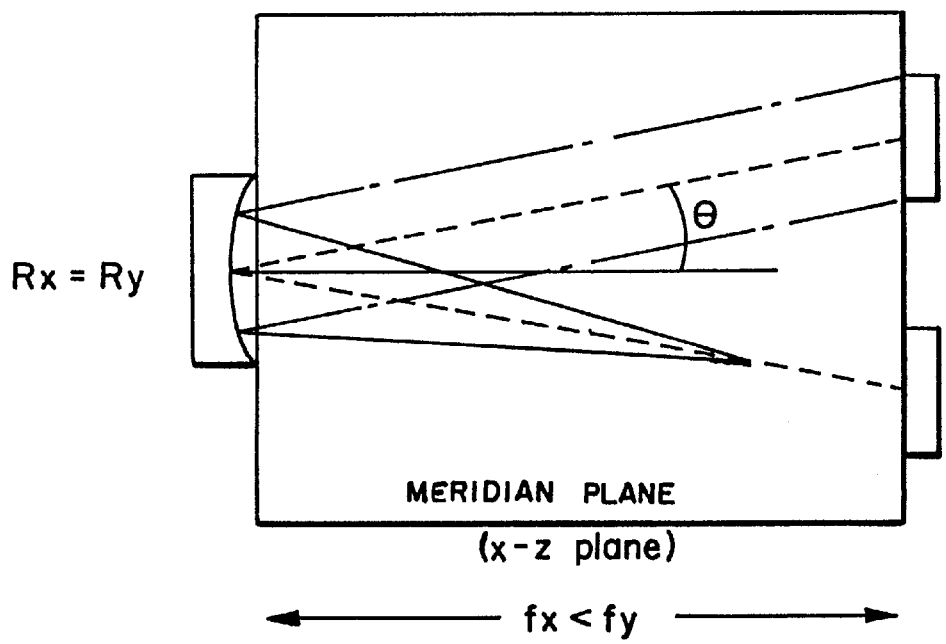
FIG. 7 is a plan view of the FIG. 5 beam path in the x-z plane.
Figure 8:
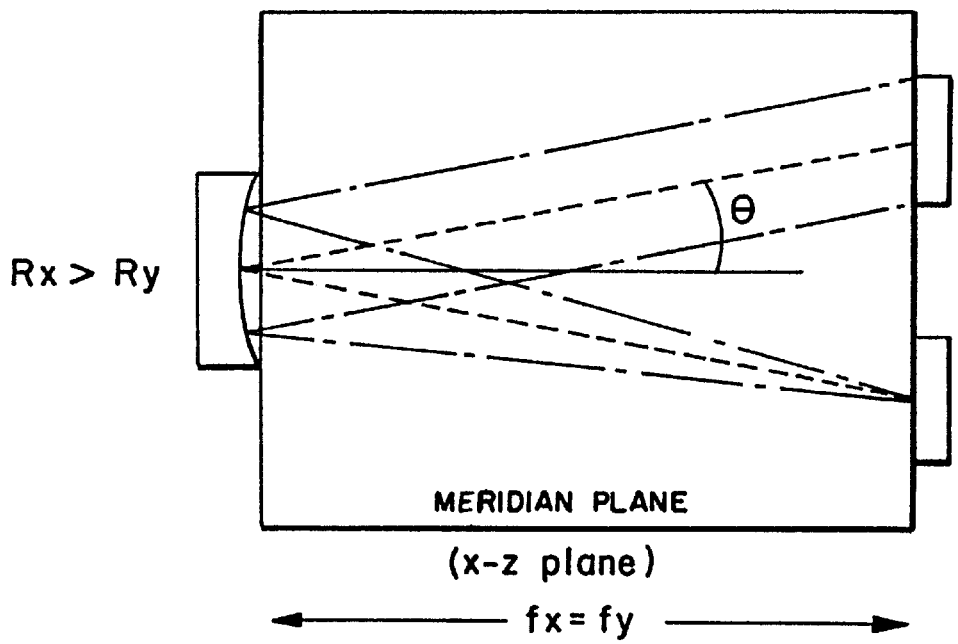
FIG. 8 is a plan view of the FIG. 5 beam path in the x-z plane using a toric mirror.

A beam that is perpendicular to a spherical mirror has the same focal length in the meridian and saggital plane, FIG. 6. But, a beam of incident angle off the perpendicular of the spherical mirror has a shorter focal length, $f_x<f_y$, when the two radii are the same, $R_x=R_y$ (FIG. 7). By accounting for the incident angle θ:

$$R_x = R_y * f(\theta)$$

therefore $f_x=f_y$ (see FIG. 8)

Without the toric mirror the beam information in the meridian plane would be a full Fourier transformation at the image plane of the next station, and the saggital plane portion of the beam would occur prior to the image plane (FIG. 7). The latter would result in an improper Fourier transformation at the image plane. There is an optimum or minimum angle ($\theta_{min}$) that defines the use of spherical over toric mirrors. That value is a function of the produciblity of the mirror radius and the ability to differentiate between the two radii.

As the toric mirror 57 produces a first Fourier transformation of the patterned energy beam incident on it and reflects the Fourier transformed energy beam through a polarizer 68 to a second SLM 59 which is also a grayscale spatial light modulator. The second grayscale SLM 59 receives the Fourier transform of a known grayscale filter pattern from a filter database in addition to the Fourier patterned energy beam. The combination of the two Fourier patterns, the input image pattern and the filter pattern, results in a multiplication of the matched Fourier signals on a pixel by pixel basis. The second, or filter SLM 59 reflects the combined pattern to a second toric mnirror 61 which performs a second Fourier transform on the combined pattern beam and reflects it to a flat mirror 63. The flat mirror 63 reflects the received energy beam to a third toric mirror 65. The two toric mirrors 61 and 65 together with the flat mirror 63 function to converge the patterned energy beam from the second toric mirror 61 onto the pixel array of the CCD detector 67. This combination completes a full Fourier transformation of the meridian and seggital portion of the patterned beam with a 4:1 reduction.

Meridian length$(fx_{61-63}+fx_{63-65}+fx_{65-67})$=Sagittal length $(fy_{61-63}+fy_{63-65}+fy_{65-67})$ The use of two toric mirrors is an issue of produciblity. Using a single toric mirror in place of toric mirrors 61 and 65 would have a seggital and meridian radius twice that of either toric mirrors 61 and 65. At present, the quality of produciblity or a singular toric mirror is a greater risk than that of two toric mirrors. The principles of the present invention would not be effected by the use of a single, dual, or ternary toric design.

A polarizer 69 is placed in the patterned beam between the toric mirror 61 and the flat mirror 63. This polarizer 69 could be placed anywhere after the second SLM 59. The CCD pixel array is generally smaller than the array of SLM 53 and SLM 59.

Figure 4:
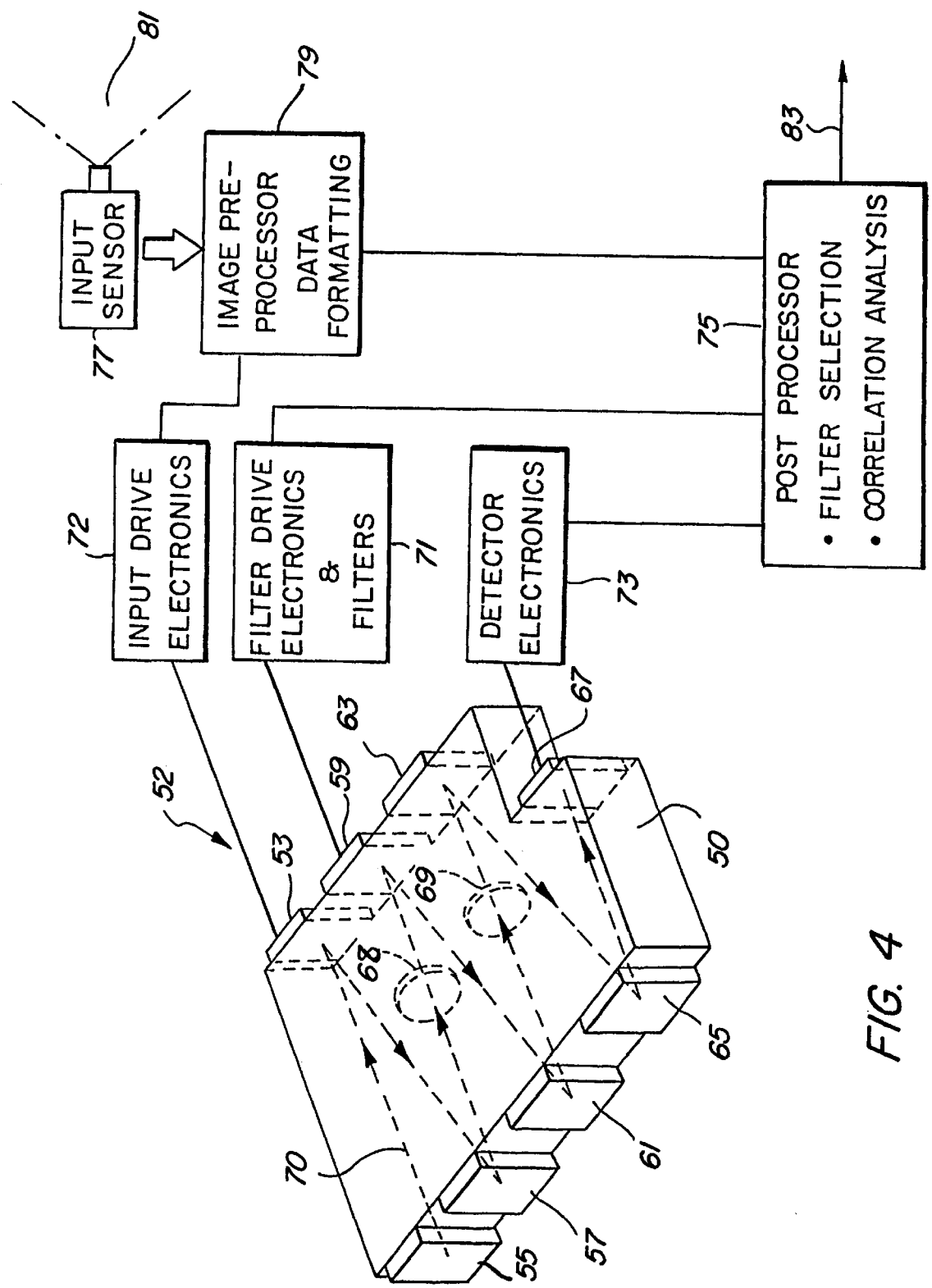
FIG. 4 is an illustration partially in perspective and partially in block diagram form of the optical correlator of FIG. 3 used in an image or pattern recognition system.

The optical correlator 52 of the present invention as shown in FIG. 4 is used as an optical processor, in a pattern recognition system, conveniently termed an electro-optical processor. Besides the optical processing occurring in the optical correlator 52, electronic processing is occurring in the electronic portion which provides general purpose pre and post processing and interfaces the optical correlator 52 with external systems. The electronic portion of the electro-optical processor shown in FIG. 4 utilizes an input sensor 77 that detects an input pattern 81 and provides information about the input pattern to an image pre-processor 79. The image pre-processor 79 utilizes algorithms and data formatting on the image information before it is supplied to input drive electronics 69 as the input for grayscale SLM 53 which may be a 256×256 pixel array. The post processor circuitry 75, in addition to, containing filter selection and correlation analysis capabilities has sufficient memory for storing a sufficient number of grayscale filters. These filters are supplied to filter drive electronics 71 and then to the second grayscale filter SLM 59.

Spatial light modulators, as discussed earlier, are either Phase or Amplitude. The filter type used must match the spatial light modulator technology. Thereby, a Binary Phase spatial light modulator must utilize a Binary Phase Only Filter (BPOF) to get a correct comparison. Correlators can be either phase or amplitude and so the filters used must be phase (BPOF) or amplitude (BAOF). Prior to the present invention, the correlation result was a phase description that is like frequency information of the xy plane. Shapes with sharp edges (e.g., squares) have high frequencies, while the shapes with soft edges (e.g., circles) have low frequencies. Straight lines have the lowest frequency. Binary filters address only one of the modulations, whereas analog addresses both.

A grayscale spatial light modulator provides both amplitude (magnitude) and phase information. Therefore, the associative filter must also be both amplitude and phase. By adding the element of amplitude, a correlation filter contains z plane frequency information (e.g., amplitude). A shape which changes from black to white (or vise versa) has a high z plane frequency. A shape with a soft transition from black to white has a low frequency in the z-plane. A constant amplitude level (i.e., all black, all white, or all gray) is the lowest z plane frequency. By applying threshold limits to the filter, the effect is the same as pre-processor edge detection.

The filters used will need to be optimized for the specific analog spatial light modulator, just as in the binary spatial light modulator, but, both amplitude and phase will be considered.

The detector electronics 73 receiving the detected signals from CCD 67 utilizes control circuitry that supports low noise readout and digitized detection of the correlation plane at the CCD array 67.

Figure 2:
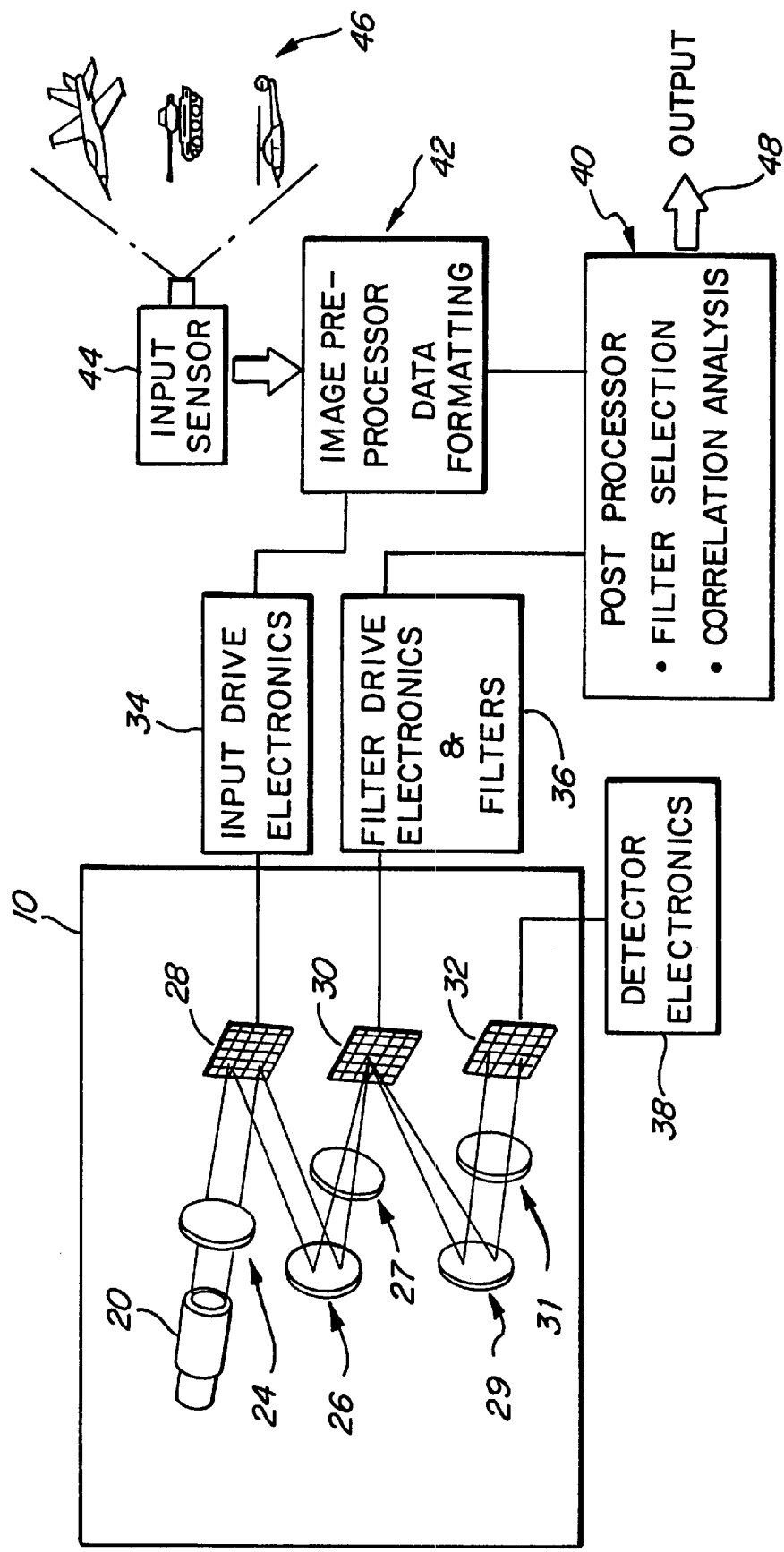
FIG. 2 is an illustration of a reflective optical correlator as used in a block diagram illustration of an image recognition system.

An Analog spatial light modulator effects the role of the image pre-processor 79. In FIG. 2, the image pre-processor's role is that of data formatting for the input drive electronics of the spatial light modulator. These formats are algorithms that effect such factors as dynamic ranging, image rotation, image size, edge detection, etc. The implementation of grayscale alters the role of the image pre-processor 79 by dispensing with the edge detection requirement. Grayscale provides for greater discrimination of observed inputs and filters. But, the key factor in grayscale is that in binary correlation, the system is area matching the filter silhouette. Therefore, internal discriminators are not a factor of correlation. In grayscale, the area matching becomes secondary to the internal discriminators in correlation. Hence dispensing with the edge detection requirement. The filter becomes more of a template cutout instead of an outline. But, the cutout can be varying levels of gray, overlapping or not. For example, a pyramid is not just a triangular outline, but an assemblage of square stones that build up a pyramid.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. An improved optical correlator for detecting and identifying an unknown object, comprising:

a first grayscale spatial light modulator (SLM) for receiving pre-processed image data of the unknown object and patterning an electromagnetic beam according to the image data of the unknown object;

a first toric mirror for performing a first Fourier transformation on the electromagnetic beam from the first SLM;

a second grayscale spatial light modulator (SLM) for receiving a pre-processed Fourier transformation pattern of a known object and patterning the electromagnetic beam from the first toric mirror according to the Fourier transformation pattern of the known object;

a second toric mirror for performing a second Fourier transformation on the electromagnetic beam from the second SLM;

a charge coupled device (CCD);

a reflective surface for converging the electromagnetic beam from the second toric mirror onto the CCD; and a third toric mirror positioned in the electromagnetic beam path between the reflective surface and the CCD for converging the electromagnetic beam from the reflective surface onto the CCD.

2. The correlator of claim 1 wherein the second and third toric mirror and the reflective surface provide a 4:1 convergence.

* * * * *